(12) United States Patent
Hwang et al.

(10) Patent No.: US 8,379,878 B2
(45) Date of Patent: Feb. 19, 2013

(54) PRE-CODING METHOD FOR PROVIDING DIVERSITY GAIN IN ORTHOGONAL FREQUENCY DIVISION MULTIPLEXING SYSTEM AND TRANSMISSION APPARATUS AND METHOD USING THE PRE-CODING METHOD

(75) Inventors: Duck-Dong Hwang, Yongin-si (KR); Junhong Hui, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1208 days.

(21) Appl. No.: 11/712,008

(22) Filed: Feb. 28, 2007

(65) Prior Publication Data

US 2007/0286302 A1 Dec. 13, 2007

Related U.S. Application Data

(60) Provisional application No. 60/777,356, filed on Feb. 28, 2006.

(30) Foreign Application Priority Data

Jun. 1, 2006 (KR) .................. 10-2006-0049393

(51) Int. Cl.
*H04B 15/00* (2006.01)
(52) U.S. Cl. ......... 381/94.2; 381/316; 381/98; 375/269; 375/272; 375/275; 375/E1.023
(58) Field of Classification Search .................. 381/316, 381/320, 321, 94.2, 94.3, 103, 97, 98; 375/144, 375/146, 234, 235, 239, 240.11, 240.24, 375/304, 344, 347, 348, 362, 260, 219, 269, 375/272, 275, 303, 323, 334, 335, 375, E1.023; 11/373, 1; 700/94
See application file for complete search history.

(56) References Cited

U.S. PATENT DOCUMENTS

| | | | |
|---|---|---|---|
| 6,173,005 B1 | 1/2001 | Kotzin et al. | |
| 6,473,467 B1 | 10/2002 | Wallace et al. | |
| 6,934,320 B2 | 8/2005 | Tujkovic et al. | |
| 7,072,411 B1 * | 7/2006 | Dollard | 375/260 |
| 7,496,148 B2 | 2/2009 | Hwang et al. | |
| 8,315,321 B2 | 11/2012 | Jacobsen et al. | |
| 2004/0013180 A1 * | 1/2004 | Giannakis et al. | 375/219 |
| 2006/0256708 A1 * | 11/2006 | Wang et al. | 370/206 |

FOREIGN PATENT DOCUMENTS

| | | |
|---|---|---|
| JP | 2001-515295 A | 9/2001 |
| JP | 2002-503048 A | 1/2002 |

(Continued)

OTHER PUBLICATIONS

Office Action issued by the Japanese Patent Office on Jul. 19, 2011, in counterpart Japanese Patent Application No. 2008-555171 (4 pages).

(Continued)

*Primary Examiner* — Vivian Chin
*Assistant Examiner* — Leshui Zhang
(74) *Attorney, Agent, or Firm* — NSIP Law

(57) ABSTRACT

A pre-coding method for improving diversity gain in an Orthogonal Frequency Division Multiplexing (OFDM) system and a transmission apparatus and method are disclosed. The transmission method includes converting an input transmission signal into parallel signals, pre-coding the parallel signals with a predetermined frequency offset, performing Inverse Discrete Fourier Transform (IDFT) on the pre-coded signals, and up-converting the IDFT signals and outputting the up-converted signals to a wireless network. By performing pre-coding on a transmission signal with a frequency offset in an OFDM system, diversity gain can be improved.

10 Claims, 3 Drawing Sheets

FOREIGN PATENT DOCUMENTS

| | | | |
|---|---|---|---|
| JP | 2004-222283 | A | 8/2004 |
| JP | 2005-523639 | A | 8/2005 |
| JP | 2007-506304 | A | 3/2007 |
| KR | 1020040064152 | | 7/2004 |
| WO | WO 99/12274 | | 3/1999 |
| WO | WO 99/40648 | A1 | 8/1999 |
| WO | WO 2004/036767 | A2 | 4/2004 |

OTHER PUBLICATIONS

Japanese Decision to Grant mailed Jan. 8, 2013, issued in counterpart Japanese Patent Application No. 2008-555171; 3 pages in Japnese language.

* cited by examiner

PRE-CODING METHOD FOR PROVIDING DIVERSITY GAIN IN ORTHOGONAL FREQUENCY DIVISION MULTIPLEXING SYSTEM AND TRANSMISSION APPARATUS AND METHOD USING THE PRE-CODING METHOD

CROSS-REFERENCE TO RELATED PATENT APPLICATION

This application claims the benefit under 35 U.S.C. §119 (a) of a U.S. patent application field in the United States Patent and Trademark Office on Feb. 28, 2006 and assigned Ser. No. 60/777,356, and a Korean Patent Application filed in the Korean Intellectual Property Office on Jun. 1, 2006 and assigned Serial No. 2006-49393, the disclosures of which are hereby incorporated by reference.

BACKGROUND OF THE INVENTION

1. Field of the Invention

The present invention generally relates to an apparatus and method for improving diversity gain in a wireless communication system, and in particular, to a pre-coding method for improving diversity gain in a mobile communication system based on Orthogonal Frequency Division Multiplexing (OFDM) and a transmission apparatus and method using the pre-coding method.

2. Description of the Related Art

Generally, the term "wireless communication system" refers to a system that has been developed for communication between terminals where a fixed wire network is not used for connecting to a terminal. The wireless communication system can typically be a mobile communication system, a wireless local area network (WLAN), a Wireless broadband (Wibro) system, and a mobile Ad Hoc system.

Unlike general wireless communication, mobile communication assumes a user's mobility. One purpose of mobile communication is to allow users to exchange information media using cellular phones and wireless pagers anywhere, anytime, and anyplace.

A typical mobile communication system is a cellular system. The term "cellular system" refers to a system in which a service area is divided into several cells and each of the cells has installed therein a single wireless base station (cellular base station) operating at a different frequency than the frequency assigned to its adjacent cell, thereby allowing the reuse of frequency. A service area covered by the single wireless base station is referred to as a cell. As such, the system operates per unit cell and thus is called a cellular system.

With the rapid development of communication technology, current mobile communication systems have evolved from the initial stage of providing only a voice service to the stage of providing a data service to users moving at high speeds. Rapidly developing wireless communication techniques in various forms have been widely used in our daily lives. After Code Division Multiplexing Access (CDMA) communication technology, known as second-generation communication technology, current communication technology enables high-speed transmission of data-information as well as voice information using third-generation wireless communication technology called International Mobile Telecommunications (IMT)-2000. In addition, Wibro or a next-generation wireless communication system that transmits higher-speed data aims at efficiently providing a high-speed packet data service. Such development of communication technology has been made in order to provide higher-quality services to users and to provide techniques for efficient system operation to operators. A representative one of the communication technology is an OFDM system that performs communication using multi-carriers.

The OFDM system divides a broadband channel into several narrow band channels, allocates frequencies that are orthogonal to each other to the channels, and transmits different data simultaneously on the orthogonal frequencies, thus being suitable for high-speed data transmission. The OFDM system can increase the number of symbol intervals for each sub-carrier to as many as the number of sub-carriers, thereby effectively reducing Inter Symbol Interference (ISI) caused by a frequency selective fading channel, and thereby simplifying the structure of a receiver.

Although the OFDM system can reduce ISI and fading resulting from multiple paths, gain from a diversity effect cannot be expected. Therefore, the OFDM system also needs a technique for improving diversity gain.

SUMMARY OF THE INVENTION

An aspect of the present invention is to address at least the above problems and/or disadvantages and to provide at least the advantages described below. Accordingly, an aspect of the present invention is to provide a pre-coding method for improving diversity gain in an Orthogonal Frequency Division Multiplexing (OFDM) system.

Another aspect of the present invention is to provide a transmission apparatus and method using a pre-coding method for improving diversity gain in an OFDM system.

According to one aspect of the present invention, there is provided a transmission apparatus which provides diversity gain in an Orthogonal Frequency Division Multiplexing (OFDM) system. The transmission apparatus includes a Serial-to-Parallel (S/P) converter for converting an input transmission signal into parallel signals, a pre-coder for pre-coding the parallel signals with a predetermined frequency offset, an Inverse Discrete Fourier Transform (IDFT) unit for performing IDFT on the pre-coded signals, and a Radio Frequency (RF) unit for up-converting the IDFT signals and outputting the up-converted signals to a wireless network.

According to another aspect of the present invention, there is provided a transmission method which provides diversity gain in an OFDM system. The transmission method includes converting an input transmission signal into parallel signals, pre-coding the parallel signals with a predetermined frequency offset, performing IDFT on the pre-coded signals, and up-converting the IDFT signals and outputting the up-converted signals to a wireless network.

BRIEF DESCRIPTION OF THE DRAWINGS

The above and other features and advantages of an exemplary embodiment of the present invention will be more apparent from the following detailed description taken in conjunction with the accompanying drawings, in which.

DETAILED DESCRIPTION OF THE EXEMPLARY EMBODIMENT

Figure 1:
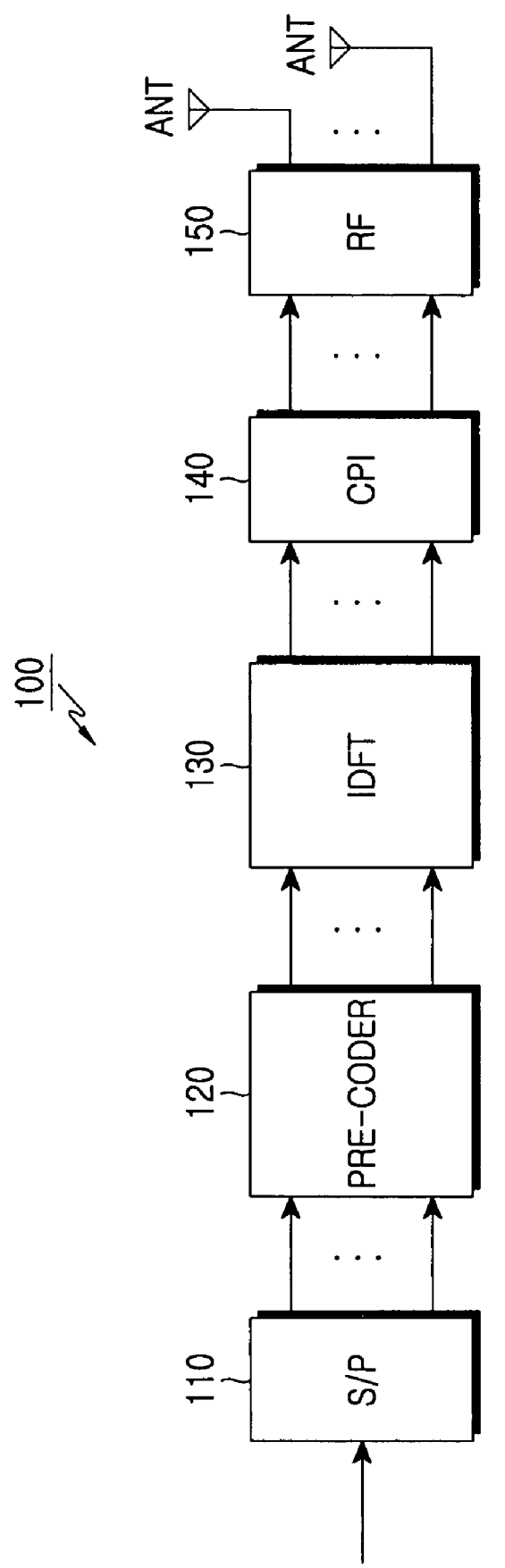
FIG. 1 is a block diagram of a transmitter using a pre-coding method in an Orthogonal Frequency Division Multiplexing (OFDM) system according to an exemplary embodiment of the present invention.

The matters defined in the description such as a detailed construction and elements are provided to assist in a comprehensive understanding of an exemplary embodiment of the invention. Accordingly, those of ordinary skill in the art will recognize that various changes and modifications of the embodiment described herein can be made without departing from the scope and spirit of the invention. Also, descriptions of well-known functions and constructions are omitted for clarity and conciseness. Throughout the drawings, the same drawing reference numerals will be understood to refer to the same elements, features and structures.

FIG. 1 is a block diagram of a transmitter 100 using a pre-coding method in an Orthogonal Frequency Division Multiplexing (OFDM) system according to an exemplary embodiment of the present invention.

Referring to FIG. 1, the transmitter 100 includes a Serial-to-Parallel (S/P) converter 110 for converting an input bit stream into a plurality of parallel bit streams, a pre-coder 120 for pre-coding the parallel bit streams output from the S/P converter 110 and outputting the pre-coded bit streams as parallel transmission symbols, an Inverse Discrete Fourier Transform (IDFT) unit 130 for performing IDFT on each of the parallel transmission symbols output from the pre-coder 120, a Cyclic Prefix Inserter (CPI) 140 for inserting a Cyclic Prefix (CP) for a guard interval, and a Radio Frequency (RF) unit 150 for up-converting a signal output from the CPI 140 and outputting the up-converted signal via a corresponding antenna ANT.

The present invention provides a technique for improving the diversity gain of a transmission signal by applying a frequency offset to the pre-coder 120 that provides diversity gain. The pre-coder 120 can be implemented by a pre-coding matrix to be described later.

The pre-coder 120 is used to provide diversity gain in an OFDM system or a multiple transmit antenna system. For example, the pre-coder 120 in an M×M unitary matrix with special properties converts symbol vectors that are sets of symbols through a pre-coding matrix to transmit each of the symbols through M different channels. If all the M channels do not undergo serious fading, the symbols can be reconstructed stably at a receiver.

The pre-coder 120 provides a diversity gain of about M in non-correlated channels. Generally, research on pre-coders has focused on algebraic number theory. However, a conventional pre-coding method using algebraic number theory cannot be implemented when the pre-coding matrix has a large size M or is not a unitary matrix. On the other hand, a matrix of a direct Discrete Fourier Transform (DFT) type or a Hadamard type does not guarantee full diversity gain, though easily implementing the pre-coder 120. Thus, the present invention provides a pre-coding matrix of the pre-coder 120, which can reduce transmission energy at a transmission side and uses a unitary matrix. Because it is based on DFT, the pre-coding matrix of the present invention can be used as a fast algorithm even when M is large.

Hereinafter, the pre-coder 120 of the present invention will be described in detail. The present invention provides the pre-coder 120 for Quadrature Amplitude Modulation (QAM) signal constellation based on DFT, which applies a frequency offset during pre-coding. To improve the diversity gain of a transmission signal based on a frequency offset, any row of a pre-coding matrix should not be spanned by a differential signal of the QAM constellation and the pre-coder 120 satisfies such a condition.

To generate the pre-coding matrix, parameters are required as follows:

TABLE 1

| Parameter | Description |
| --- | --- |
| S | Set of symbol vectors having size M, Elements of these symbols vectors are comprised of used symbol constellation. |
| E | Set of error vectors having size M, Elements of these error vectors indicate difference vectors between elements of S. |
| m | Size of parameter S. |
| P | Set of output vectors having size M, generated from E by pre-coder. |
| F | Pre-coding transformation. |
| e | Elements of E. |

In Table 1, "S" indicates a set of symbol vectors having a size of M and elements of these symbol vectors are comprised of the symbol constellation. "E" indicates a set of error vectors having a size of M and elements of these error vectors indicate difference vectors indicating differential signals between the elements of S. If S has a size of m, the size of E is equal to the number of selections of two from m. "P" indicates a set of output vectors having a size of M, generated from E by the pre-coder 120.

The pre-coder 120 using an M×M pre-coding matrix is used to spread error symbols of E into M carriers and thus the output vectors of P do not have "0" at any one of M symbol positions.

When "F" is pre-coding transformation as in Table 1, the above description is equivalent to the design standard of the pre-coder 120 in which any element e of E is a linear combination of M basis vectors of F. If e is a linear combination of fewer vectors than the M basis vectors, a pre-coding transformed vector has non-zero positions corresponding to the number of basis vectors used in the linear combination. If a basis vector of F is not spanned by the constellation for elements of e, the above-described standard is met.

On the assumption that basis vectors of a DFT kernel, i.e. a DFT function, are generated by points of $2kn\pi/M$ (n and k=0, 1, 2, ..., M−1), these points can be spanned by error signal constellation between Binary Phase Shift Keying (BPSK) signal points and signal points of Quadrature Phase Shift Keying (QPSK) can be spanned by $k\pi$ (k=0, 1, 2, 3). The signal points spanned by QPSK are generated in DFT in which M is a power greater than 2.

In the present invention, the pre-coder 120 has a frequency offset for preventing the basis vectors e from being spanned for sets of BPSK and QPSK signals through constellation analysis of a QAM signal.

To this end, signal points of the basis vectors are expressed as Equation (1):

$$(2k+1)n\pi/M \qquad (1)$$

where n=0, 1, ..., (M−1) and k=1, 2, ..., M.

For M=2, the signal points of the basis vectors can also be expressed as Equation (2):

$$kn\pi/4 \qquad (2),$$

where n=0, 1 and k=1, 5.

In the present invention, matrices of the pre-coder 120 are expressed as Equation (3) for M=2, and matrices of the pre-coder 120 are expressed as Equation (4) for M>2 (i.e., M>=3).

$$\frac{1}{\sqrt{2}}\begin{bmatrix} 1 & 1 \\ e^{-j\frac{\pi}{4}} & e^{-j\frac{5\pi}{4}} \end{bmatrix}, M = 2 \quad (3)$$

$$\frac{1}{\sqrt{M}}\begin{bmatrix} 1 & 1 & \cdots & 1 \\ e^{-j\frac{\pi}{M}} & e^{-j\frac{3\pi}{M}} & \cdots & e^{-j\frac{(2M-1)\pi}{M}} \\ \vdots & \vdots & \ddots & \vdots \\ e^{-j\frac{(M-1)\pi}{M}} & e^{-j\frac{3(M-1)\pi}{M}} & \cdots & e^{-j\frac{(2M-1)(M-1)\pi}{M}} \end{bmatrix}, M \geq 3 \quad (4)$$

Figure 2:
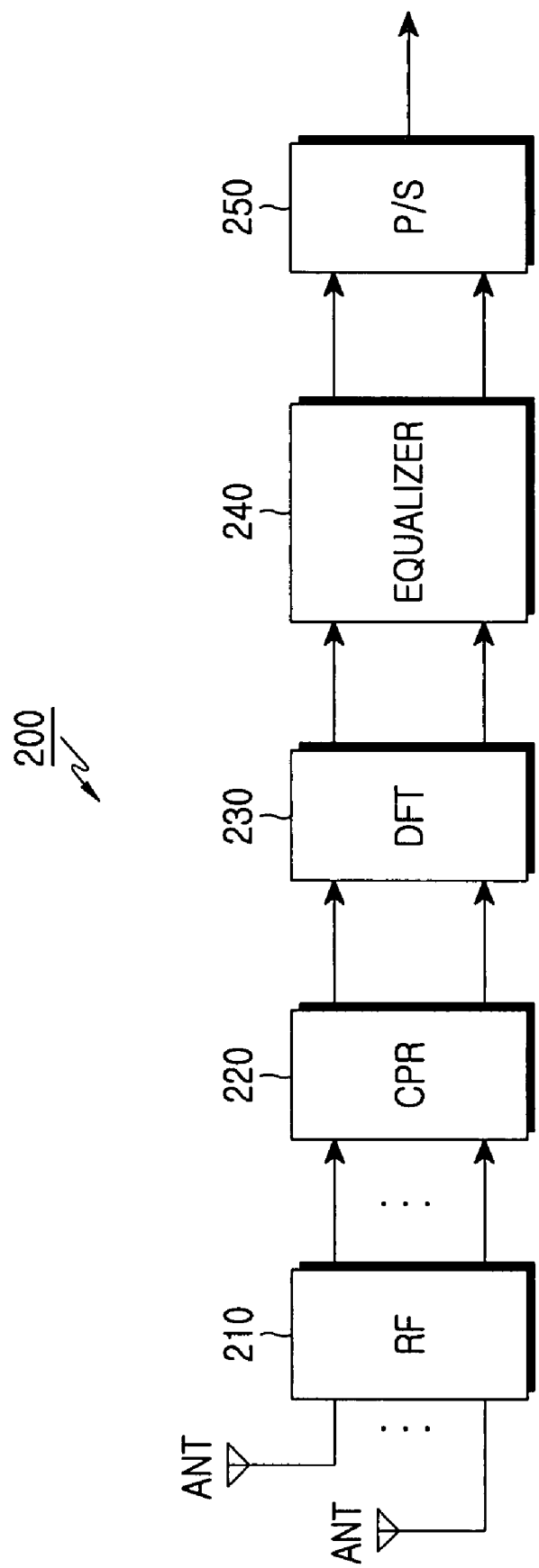
FIG. 2 is a block diagram of a receiver including an equalizer in an OFDM system according to an exemplary embodiment of the present invention.

FIG. 2 is a block diagram of a receiver 200 including an equalizer in an OFDM system according to an exemplary embodiment of the present invention.

Referring to FIG. 2, the receiver 200 includes an RF unit 210 for down-converting signals received via a plurality of receive antennas corresponding to the transmit antennas of FIG. 1, a CP Remover (CPR) 220 for removing a CP from a signal output from the RF unit 210, a DFT unit 230 for performing DFT on a CP-removed signal, an equalizer 240 for removing distortion caused by pre-coding from the DFT signal, and a Parallel-to-Serial (P/S) converter 250. Although not shown in FIG. 2, the receiver 200 may further include maximum likelihood, variance of a sphere detector, Minimum Mean Square Error (MMSE), zero-forcing, and a continuous interference filter, as understood by those of skill in the art.

The pre-coded vector is a diagonal element of a spatial-temporal transmission matrix at multiple transmit antennas and in this case, the number of antennas has to be smaller than M.

Figure 3:
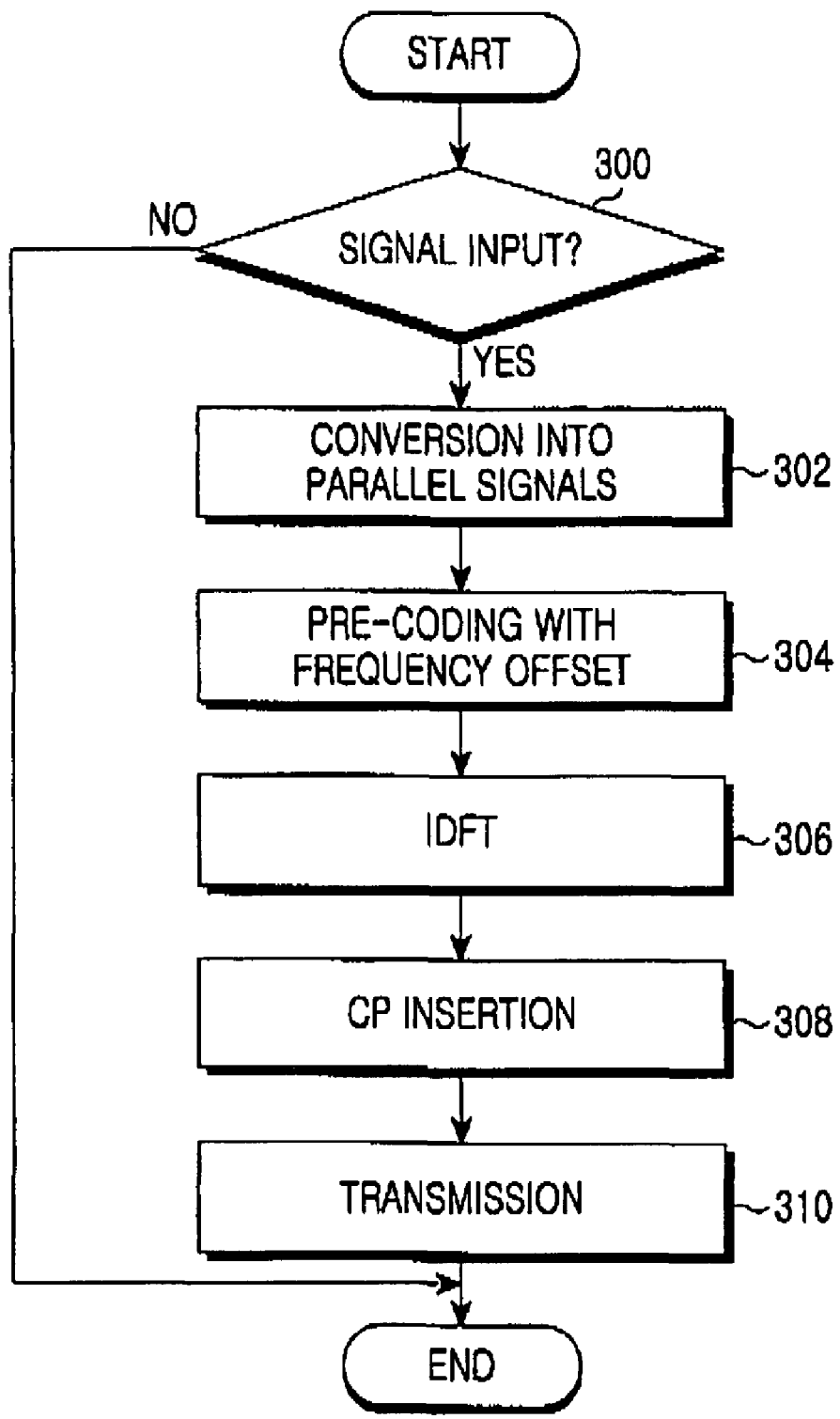
FIG. 3 is a flowchart showing the operation of a transmitter in an OFDM system according to an exemplary embodiment of the present invention.

FIG. 3 is a flowchart of the operation of the transmitter 100 according to an exemplary embodiment of the present invention. Referring to FIG. 3, if a signal is input in step 300, the S/P converter 110 converts the input signal into parallel signals in step 302. The pre-coder 120 pre-codes the parallel signals with a frequency offset in step 304. The pre-coding in step 304 is performed using Equation (3) or Equation (4) according to the size M of the pre-coder 120. In step 306, the IDFT unit 130 performs IDFT on the pre-coded signals. The CPI 140 inserts a CP into the IDFT signal in step 308, and the RF unit 150 up-converts the CP-inserted signal and transmits the up-converted signal to a wireless network via an antenna ANT in step 310.

As described above, by performing pre-coding on a transmission signal with a frequency offset in an OFDM system, diversity gain can be improved.

While the invention has been shown and described with reference to an exemplary embodiment thereof, it will be understood by those skilled in the art that various changes in form and details may be made therein without departing from the spirit and scope of the invention.

What is claimed is:

1. A transmission apparatus which provides diversity gain in an Orthogonal Frequency Division Multiplexing (OFDM) system, the transmission apparatus comprising:
    a Serial-to-Parallel (S/P) converter for converting an input transmission signal into parallel signals;
    a pre-coder for pre-coding the parallel signals with a predetermined frequency offset;
    an Inverse Discrete Fourier Transform (IDFT) unit for performing IDFT on the pre-coded signals; and
    a Radio Frequency (RF) unit for up-converting the IDFT signals and outputting the up-convertedsignals to a wireless network, wherein
    a signal point on a constellation of basis vectors is expressed according to the frequency offset as:

$(2k+1)n\pi/M$, where n=0, 1, . . . , (M−1), k=1, 2, . . . , M, and M indicates a size of the pre-coder,
    the frequency offset is set in order not to span basis vectors of a Discrete Fourier Transform (DFT) kernel, and
    the span of the basis vectors of the DFT kernel is caused by an error signal constellation between digital audio signal modulations.

2. The transmission apparatus of claim 1, wherein for M=2, a signal point on a constellation of the basis vectors is expressed as:

$kn\pi/4$, where n=0, 1 and k=1, 5.

3. The transmission apparatus of claim 1, wherein for M = 2, matrices of the pre-coder are expressed as:

$$\frac{1}{\sqrt{2}}\begin{bmatrix} 1 & 1 \\ e^{-j\frac{\pi}{4}} & e^{-j\frac{5\pi}{4}} \end{bmatrix}, M = 2.$$

4. The transmission apparatus of claim 1, wherein for M>=3, matrices of the pre-coder are expressed as:

$$\frac{1}{\sqrt{M}}\begin{bmatrix} 1 & 1 & \cdots & 1 \\ e^{-j\frac{\pi}{M}} & e^{-j\frac{3\pi}{M}} & \cdots & e^{-j\frac{(2M-1)\pi}{M}} \\ \vdots & \vdots & \ddots & \vdots \\ e^{-j\frac{(M-1)\pi}{M}} & e^{-j\frac{3(M-1)\pi}{M}} & \cdots & e^{-j\frac{(2M-1)(M-1)\pi}{M}} \end{bmatrix}, M \geq 3.$$

5. The transmission apparatus of claim 1, wherein the transmission signal comprises a Quadrature Amplitude Modulation (QAM) signal.

6. A transmission method which provides diversity gain in an Orthogonal Frequency Division Multiplexing (OFDM) system, the transmission method comprising:
    converting an input transmission signal into parallel signals;
    pre-coding the parallel signals with a predetermined frequency offset;
    performing Inverse Discrete Fourier Transform (IDFT) on the pre-coded signals; and
    up-converting the IDFT signals and outputting the up-converted signals to a wireless network, wherein
    a signal point on a constellation of basis vectors is expressed according to the frequency offset as:

$(2k+1)n\pi/M$, where n=0, 1, . . . , (M−1), k=1, 2, . . . , M, and M indicates a size of a pre-coder for performing the pre-coding,
    the frequency offset is set in order not to span basis vectors of a Discrete Fourier Transform (DFT) kernel, and
    the span of the basis vectors of the DFT kernel is caused by an error signal constellation between digital audio signal modulations.

7. The transmission method of claim 6, wherein for M=2, a signal point on a constellation of the basis vectors is expressed as:

$kn\pi/4$, where n=0, 1 and k=1, 5.

8. The transmission method of claim 6, wherein for M=2, matrices of a pre-coder for performing the pre-coding are expressed as:

$$\frac{1}{\sqrt{2}}\begin{bmatrix} 1 & 1 \\ e^{-j\frac{\pi}{4}} & e^{-j\frac{5\pi}{4}} \end{bmatrix}, M = 2.$$

9. The transmission method of claim 6, wherein for M>=3, matrices of a pre-coder for performing the pre-coding are expressed as follows:

$$\frac{1}{\sqrt{M}}\begin{bmatrix} 1 & 1 & \cdots & 1 \\ e^{-j\frac{\pi}{M}} & e^{-j\frac{3\pi}{M}} & \cdots & e^{-j\frac{(2M-1)\pi}{M}} \\ \vdots & \vdots & \ddots & \vdots \\ e^{-j\frac{(M-1)\pi}{M}} & e^{-j\frac{3(M-1)\pi}{M}} & \cdots & e^{-j\frac{(2M-1)(M-1)\pi}{M}} \end{bmatrix}, M \geq 3.$$

10. The transmission method of claim 6, wherein the transmission signal comprises a Quadrature Amplitude Modulation (QAM) signal.

* * * * *